No. 827,474. PATENTED JULY 31, 1906.
A. T. STEWART.
EGG BEATER.
APPLICATION FILED OCT. 3, 1905.

Witnesses:

Inventor,
Alexander T. Stewart,
By
Attorneys.

UNITED STATES PATENT OFFICE.

ALEXANDER T. STEWART, OF PITTSBURG, PENNSYLVANIA.

EGG-BEATER.

No. 827,474.  Specification of Letters Patent.  Patented July 31, 1906.

Application filed October 3, 1905. Serial No. 281,112.

*To all whom it may concern:*

Be it known that I, ALEXANDER T. STEWART, a citizen of the United States of America, residing at Pittsburg, in the county of Allegheny and State of Pennsylvania, have invented certain new and useful Improvements in Egg-Beaters, of which the following is a specification, reference being had therein to the accompanying drawings.

This invention relates to certain new and useful improvements in egg-beaters; and the invention has for its object to provide a novel form of receptacle in which eggs may be placed and easily and rapidly beaten.

My invention aims to provide a receptacle containing a dasher adapted to be manually reciprocated, the dasher being constructed to thoroughly agitate the contents of the receptacle and mix the same. To this end I have constructed a receptacle conforming substantially to an inverted-cone shape, the receptacle being supported by a suitable base and provided with a lid to retain the contents of the receptacle therein during the operation of agitating the contents. In the receptacle is mounted a dasher or plunger which extends upwardly through the lid of the receptacle to be manually reciprocated. The dasher consists of a plurality of perforated disks conforming in diameter to the various diameters of the receptacle in which it is mounted.

The detail construction of my improved egg-beater will be presently described, and reference will now be had to the accompanying drawings, wherein like numerals of reference designate corresponding parts throughout the several views, in which—

Figure 1:
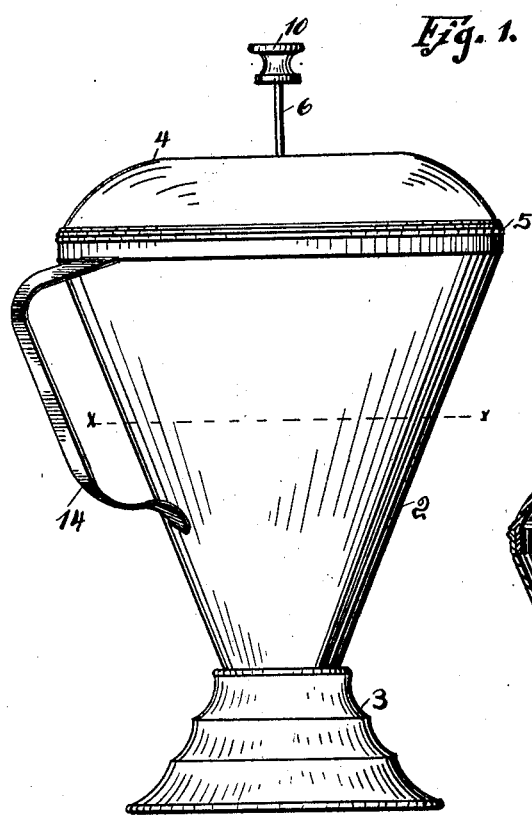
Figure 2:
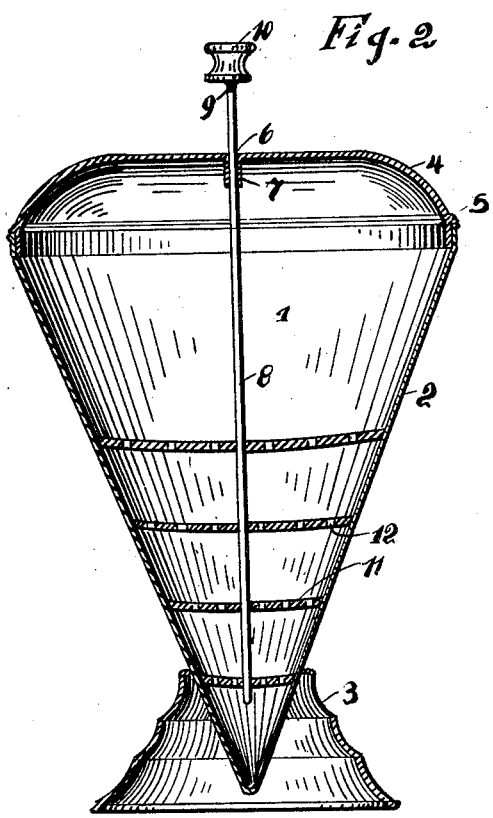
Figure 3:
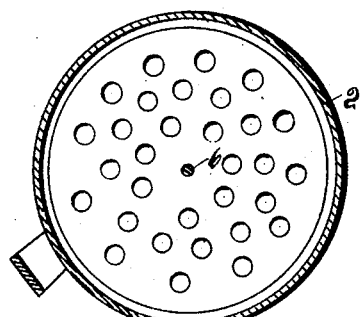

Figure 1 is a side elevation of the egg-beater. Fig. 2 is a vertical sectional view. Fig. 3 is a horizontal sectional view taken on the line $x\,x$ of Fig. 1.

The egg-beater embodies a receptacle 1, having a tapering converging wall 2, the receptacle conforming substantially to an inverted-cone shape. The receptacle is supported by a substantially frustum-cone shaped base 3, which may be suitably ornamented, in the present instance the base being provided with annular flutes or grooves. Upon the receptacle is adapted to fit a lid 4, which is adapted to fit within the top of the receptacle, the lid being provided with an annular flange 5 to engage the top edges of the receptacle. Centrally of the lid is formed an aperture 6, and surrounding this aperture is a depending sleeve 7, which serves functionally as a guide. Passing through the aperture and sleeve 7 is a rod or dasher 8, the upper end of which is screw-threaded, as at 9, and provided with a handle or knob 10. The lower end of the rod or dasher 8 is provided with a plurality of disks 11, said disks being perforated, as at 12, these disks varying in diameter according to the diameter of the receptacle 1, in the present instance I having illustrated four disks which are spaced apart upon the dasher and occupy approximately one-half the receptacle. The receptacle is provided with a conventional form of handle 14, this handle being secured to the wall 2 of the receptacle in order that the same may be conveniently carried.

In operation the eggs to be beaten or agitated are placed in the receptacle 1 and the lid placed thereon, the dasher carried by said lid being immersed in the eggs to be beaten. By a person reciprocating the dasher the eggs are thoroughly mixed and agitated, and as the tendency of the eggs is to descend to the bottom of the receptacle an upward movement of the dasher will elevate the eggs, permitting them to percolate through the perforations of the disks, and by rapidly reciprocating the dasher the eggs can be beaten to a sufficient stiffness and removed for the purposes for which they are to be used. The disks of varying diameter coöperate with the cone-shaped receptacle in the following manner: As the rod or dasher 8 is depressed the outer edges of the disks gradually approach the inner wall of the receptacle, and consequently the space through which the eggs are forced around the edges of the disks gradually decreases in size as the disks approach the walls of the vessel, and hence as the descent of the rod will be usually at a regular rate of motion the movement of the eggs past the edge of the disk will of course be at a swiftly-increasing rate as the edges of the disk approach the walls of the receptacle, the movement of the eggs being therefore irregular and this irregularity of movement tending to beat the eggs more rapidly and better than if the movement was perfectly regular—that is, in the nature of a steadily-flowing stream. Of course during the downward movement of the rod the portion of the eggs will flow through the openings 12 in the disk; but a large quantity will flow around the edges of the disk.

By the construction of my improved egg-beater it will be seen that the lid and dasher are constructed whereby when the lid is removed the dasher is also removed from the receptacle, and the different parts of the beater can be easily and quickly cleansed and assembled at any time desired.

The beater is preferably made of a strong and durable metal which may be plated to present a neat and attractive appearance.

It will be noted that various changes may be made in the details of construction without departing from the spirit and scope of the invention or sacrificing any of the advantages thereof.

What I claim, and desire to secure by Letters Patent, is—

1. In an egg-beater, the combination of a receptacle of cone shape, with the apex of the cone at the bottom of the vessel, a base surrounding said vessel near its lower end, said base extending below said lower end, with a lid fitting on said receptacle, a dasher-rod extending through the lid into the receptacle, a plurality of perforated disks fixed on said dasher-rod, said disks being of gradually-increasing size from the lowermost to the uppermost disk and so arranged on the rod that all of the disks will, when the rod is depressed, simultaneously come into contact with the inner surface of the receptacle.

2. An egg-beater comprising a cone-shaped receptacle, a lid carried by said receptacle, a dasher-rod extending through said lid, a plurality of perforated disks spaced at equal distances apart on said dasher-rod, said disks diminishing in size from the upper to the lower disk conformably to the diminution of the receptacle, and means for sustaining said receptacle in an upright position with its narrowest end downwardly.

In testimony whereof I affix my signature in the presence of two witnesses.

ALEXANDER T. STEWART.

Witnesses:
  E. E. POTTER,
  M. E. LAWSON.